(12) United States Patent
Ota et al.

(10) Patent No.: US 12,129,113 B2
(45) Date of Patent: Oct. 29, 2024

(54) CONTROL DEVICE, CONVEYANCE SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Junya Ota, Tokyo (JP); Kunihiro Iwamoto, Nagakute (JP); Yuta Itozawa, Nagoya (JP); Hirotaka Komura, Tokyo (JP); Yutaro Takagi, Tokyo (JP); Yoshiaki Nakamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 396 days.

(21) Appl. No.: 17/584,843

(22) Filed: Jan. 26, 2022

(65) Prior Publication Data
US 2022/0242663 A1    Aug. 4, 2022

(30) Foreign Application Priority Data

Feb. 4, 2021   (JP) .................................. 2021-016918

(51) Int. Cl.
*B65G 1/04*    (2006.01)
(52) U.S. Cl.
CPC .... *B65G 1/0421* (2013.01); *B65G 2203/0258* (2013.01); *B65G 2203/0283* (2013.01); *B65G 2203/0291* (2013.01)
(58) Field of Classification Search
CPC .......... B65G 1/0421; B65G 2203/0258; B65G 2203/0283; B65G 2203/0291
See application file for complete search history.

(56) References Cited

U.S. PATENT DOCUMENTS

| 2012/0235612 | A1* | 9/2012 | Akashi ..................... H02P 6/10 |
| | | | 318/400.23 |
| 2014/0071460 | A1* | 3/2014 | Suzuki ................... G01B 5/008 |
| | | | 33/503 |
| 2020/0108503 | A1* | 4/2020 | Yoshino ................ B25J 9/1694 |
| 2020/0262685 | A1 | 8/2020 | Kanda et al. |

(Continued)

FOREIGN PATENT DOCUMENTS

| CN | 111132922 A | 5/2020 |
| JP | H06-278080 A | 10/1994 |
| JP | 2007-269450 A | 10/2007 |

(Continued)

OTHER PUBLICATIONS

Machine translation of JP2017095265 (Year: 2017).*
Machine translation of JP2007276962 (Year: 2007).*

*Primary Examiner* — Jaime Figueroa
*Assistant Examiner* — Mohamad O El Sayah
(74) *Attorney, Agent, or Firm* — Oliff PLC

(57) ABSTRACT

A control device for a conveyance robot including a telescopic portion which is extensible in a height direction is provided. The control device includes an estimation unit configured to estimate a natural frequency of the conveyance robot according to an amount of extension of the telescopic portion and a control unit configured to control a drive mechanism of the conveyance robot such that the natural frequency of the conveyance robot and an angular frequency of a vibration generating portion when the conveyance robot operates do not match.

10 Claims, 6 Drawing Sheets

(56) References Cited

U.S. PATENT DOCUMENTS

2021/0269278 A1* 9/2021 Hirabayashi .......... B66B 1/3492
2021/0371255 A1* 12/2021 Kanda .................... B66C 23/42

FOREIGN PATENT DOCUMENTS

| JP | 2007-276962 A | 10/2007 |
| JP | 2015-199149 A | 11/2015 |
| JP | 2017-095265 A | 6/2017 |
| JP | 2020-059063 A | 4/2020 |

* cited by examiner

CONTROL DEVICE, CONVEYANCE SYSTEM, CONTROL METHOD, AND NON-TRANSITORY STORAGE MEDIUM

CROSS-REFERENCE TO RELATED APPLICATION

This application claims priority to Japanese Patent Application No. 2021-016918 filed on Feb. 4, 2021, incorporated herein by reference in its entirety.

BACKGROUND

1. Technical Field

The present disclosure relates to a control device, a conveyance system, a control method, and a control program and, for example, to a control device for a conveyance robot including a telescopic portion which is extensible in a height direction, a conveyance system, a control method, and a control program.

2. Description of Related Art

When a conveyance robot including a telescopic portion which is extensible in a height direction operates, the natural frequency of the conveyance robot varies depending on an amount of extension of the telescopic portion and it is preferable to curb vibration of the conveyance robot such that the conveyance robot at that time is stable.

A conveyance device disclosed in Japanese Unexamined Patent Application Publication No. 2017-95265 (JP 2017-95265 A) includes a bogie that is connected to an installation surface such that it moves along the installation surface and a lifting carriage that is installed in the bogie and ascends and descends with a conveyance object loaded thereon, and calculates an acceleration time or a deceleration time of the bogie at which vibration is curbed based on the natural frequency corresponding to a height of the lifting carriage.

SUMMARY

The applicant of the present disclosure found the following problems. In the conveyance device disclosed in JP 2017-95265 A, since the bogie is connected to an installation surface, the bogie can travel stably regardless of the height of the lifting carriage, but since the conveyance robot is not connected to a movement surface, it is difficult to make the conveyance robot operate stably according to an amount of extension of a telescopic portion.

The present disclosure provides a control device, a conveyance system, a control method, and a control program that can allow a conveyance robot to operate stably according to an amount of extension of a telescopic portion of the conveyance robot.

According to an aspect of the present disclosure, there is provided a control device for a conveyance robot including a telescopic portion which is extensible in a height direction, the control device including: an estimation unit configured to estimate a natural frequency of the conveyance robot according to an amount of extension of the telescopic portion; and a control unit configured to control a drive mechanism of the conveyance robot such that the natural frequency of the conveyance robot and an angular frequency of a vibration generating portion when the conveyance robot operates do not match.

The control device may further include a weight acquisition unit configured to acquire a measurement result of a weight of a conveyance object which is placed on a mounting portion provided at an upper end of the telescopic portion. The estimation unit may be configured to estimate the natural frequency of the conveyance robot based on a total weight of a weight of the mounting portion and the weight of the conveyance object and a rigidity of the telescopic portion.

According to another aspect of the present disclosure, there is provided a conveyance system including the control device and the conveyance robot.

The conveyance system may further include a weight sensor that measures a weight of a conveyance object which is placed on a mounting portion provided at an upper end of the telescopic portion.

In the conveyance system, the vibration generating portion may be a drive mechanism that extends or contracts the telescopic portion.

According to another aspect of the present disclosure, there is provided a control method for a conveyance robot including a telescopic portion which is extensible in a height direction, the control method including: estimating a natural frequency of the conveyance robot according to an amount of extension of the telescopic portion; and controlling a drive mechanism of the conveyance robot such that the natural frequency of the conveyance robot and an angular frequency of a vibration generating portion when the conveyance robot operates do not match.

The control method may further include: measuring a weight of a conveyance object which is placed on a mounting portion provided at an upper end of the telescopic portion; and estimating the natural frequency of the conveyance robot based on a total weight of a weight of the mounting portion and the weight of the conveyance object and a rigidity of the telescopic portion.

According to another aspect of the present disclosure, there is provided a control program for a conveyance robot including a telescopic portion which is extensible in a height direction, the control program causing a computer to perform: estimating a natural frequency of the conveyance robot according to an amount of extension of the telescopic portion; and controlling a drive mechanism of the conveyance robot such that the natural frequency of the conveyance robot and an angular frequency of a vibration generating portion when the conveyance robot operates do not match.

The control program may cause the computer to further perform: measuring a weight of a conveyance object which is placed on a mounting portion provided at an upper end of the telescopic portion; and estimating the natural frequency of the conveyance robot based on a total weight of a weight of the mounting portion and the weight of the conveyance object and a rigidity of the telescopic portion.

According to the present disclosure, it is possible to provide a control device, a conveyance system, a control method, and a control program that can allow the conveyance robot to operate stably according to an amount of extension of the telescopic portion of the conveyance robot.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a specific embodiment of the present disclosure will be described in detail with reference to the accompanying drawings. The present disclosure is not limited the following embodiment. For the purpose of clarification of explanation, the following description and the drawings are appropriately simplified.

Figure 1:
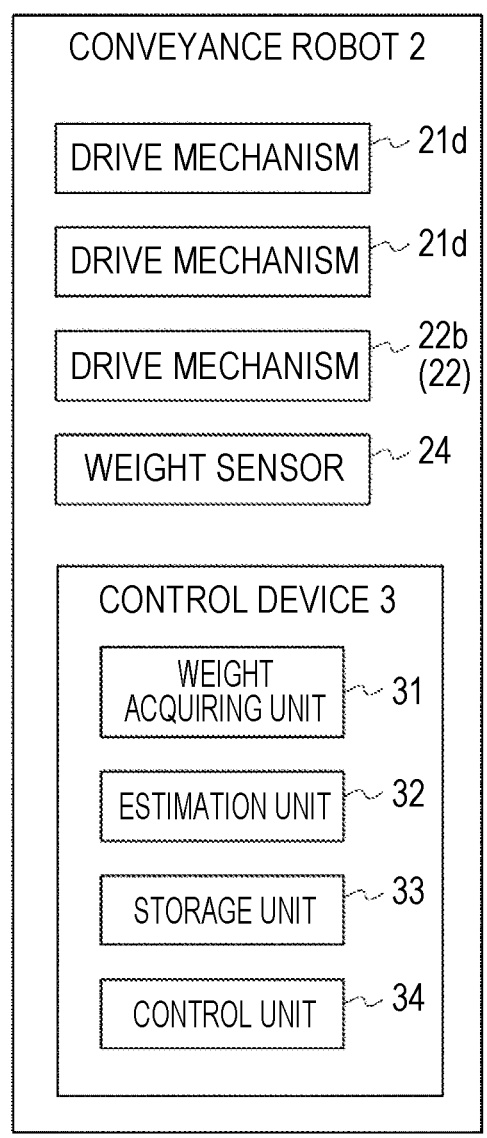
FIG. 1 is a block diagram illustrating a control system of a conveyance system according to an embodiment.

A conveyance system according to an embodiment can be suitably used, for example, when a conveyance robot including a telescopic portion which is extensible in a height direction (that is, a vertical direction) conveys a conveyance object. FIG. 1 is a block diagram illustrating a control system of the conveyance system according to the embodiment. As illustrated in FIG. 1, the conveyance system 1 includes a conveyance robot 2 and a control device 3.

Figure 2:
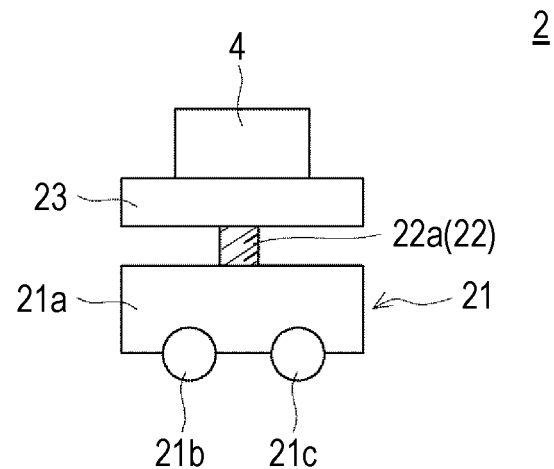
FIG. 2 is a side view illustrating a state in which a telescopic portion is contracted in a conveyance robot according to the embodiment.
Figure 3:
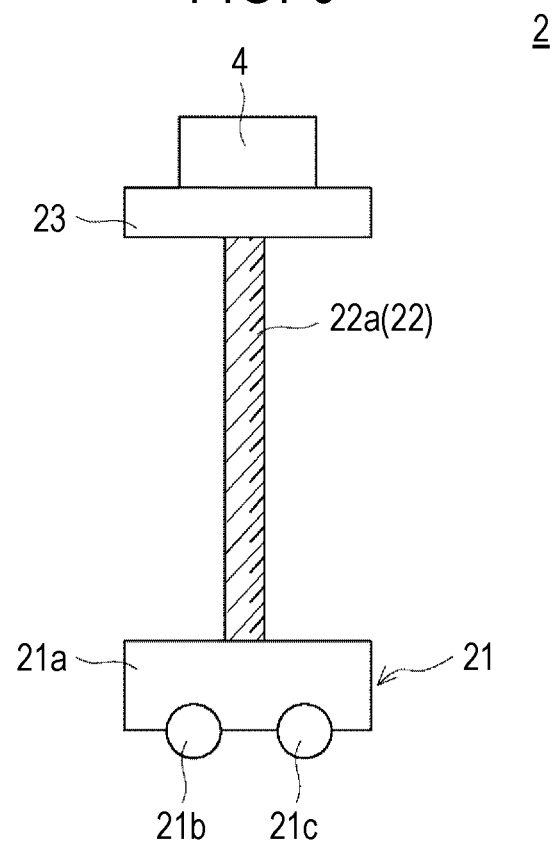
FIG. 3 is a side view illustrating a state in which the telescopic portion is extended in the conveyance robot according to the embodiment.

FIG. 2 is a side view illustrating a state in which a telescopic portion is contracted in the conveyance robot according to the embodiment. FIG. 3 is a side view illustrating a state in which the telescopic portion is extended in the conveyance robot according to the embodiment. In FIGS. 2 and 3, the conveyance robot 2 in which a conveyance object 4 is placed on a mounting portion 23 of the conveyance robot 2 is illustrated.

The conveyance robot 2 is, for example, an autonomous mobile robot. As illustrated in FIGS. 1 to 3, the conveyance robot 2 includes a mobile portion 21, a telescopic mechanism 22, a mounting portion 23, and a weight sensor 24. The mobile portion 21 includes a robot body 21a, a pair of driving wheels 21b and a pair of driven wheels 21c which are rotatably provided in the robot body 21a, and a pair of drive mechanisms 21d that rotationally drives the driving wheels 21b.

Each drive mechanism 21d includes a motor and a reduction gear and has, for example, a configuration in which a rotational angular velocity of the motor is detected by a rotation sensor. By causing the driving wheels 21b to rotate, forward movement, rearward movement, and rotation of the robot body 21a are realized. Accordingly, the robot body 21a can move to an arbitrary position.

The configuration of the mobile portion 21 is an example and the present disclosure is not limited thereto. For example, the number of driving wheels 21b and the number of driven wheels 21c of the mobile portion 21 are arbitrary and a known mechanism can be used as long as it can move the robot body 21a to an arbitrary position.

The telescopic mechanism 22 extends and contracts in a height direction of the conveyance robot 2. For example, the telescopic mechanism 22 can be configured as a telescope type telescopic mechanism and includes, for example, a telescopic portion 22a and a drive mechanism 22b.

Figure 4:
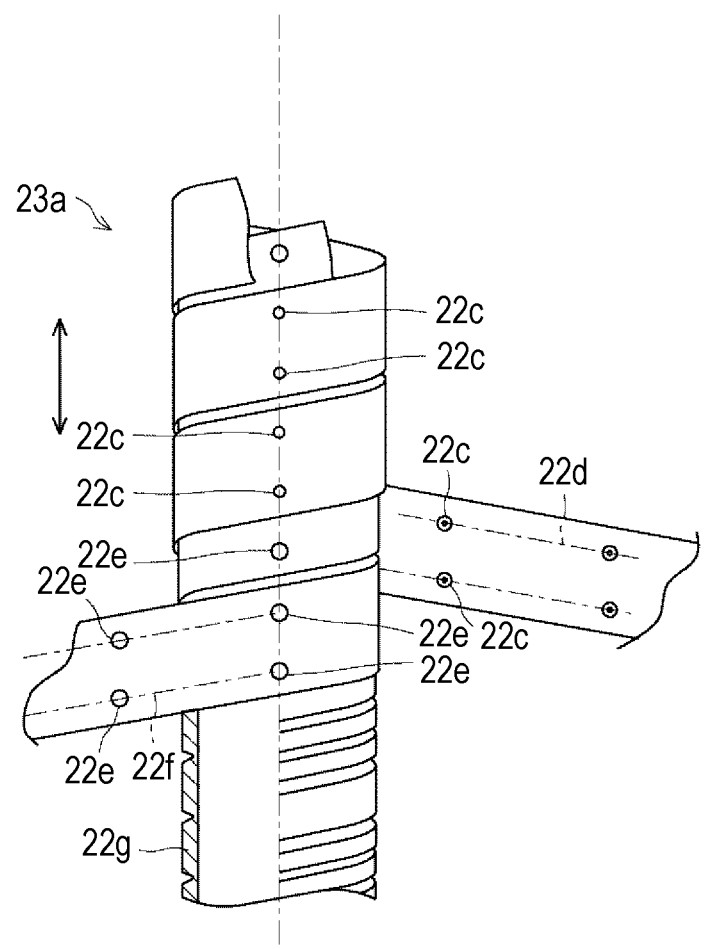
FIG. 4 is a diagram illustrating a configuration of the telescopic portion of the conveyance robot according to the embodiment.

As illustrated in FIGS. 2 and 3, the telescopic portion 22a protrudes upward from the mobile portion 21. FIG. 4 is a diagram illustrating a configuration of the telescopic portion according to this embodiment. For example, the telescopic portion 22a includes a first belt 22d including a first engagement mechanism 22c and a second belt 22f including a second engagement mechanism 22e that is able to engage with and disengage from the first engagement mechanism 22c. The first belt 22d and the second belt 22f are formed of, for example, a rigid material such as a metal sheet or a hard synthetic resin sheet and has appropriate flexibility and elasticity.

As illustrated in FIG. 4, in the telescopic portion 22a, the first belt 22d and the second belt 22f are wound around the same axis in a spiral shape in a state in which the first engagement mechanism 22c of the first belt 22d and the second engagement mechanism 22e of the second belt 22f overlap each other to form a columnar structure. For example, the first belt 22d is wound around the outer circumference side of the second belt 22f.

Specifically, a part of an upper edge side of the first belt 22d externally overlaps a part of a lower edge side of the second belt 22f disposed thereabove and a part of an upper edge side of the second belt 22f internally overlaps a part of a lower edge side of the first belt 22d disposed thereabove. That is, the telescopic portion 22a has a configuration in which the first belt 22d and the second belt 22f which are wound in a spiral shape alternately overlap each other partially in the height direction.

Here, the first engagement mechanism 22c and the second engagement mechanism 22e are configured as, for example, engagement pins and engagement holes and engage with each other. In this way, since overlapping planar parts of the first belt 22d and the second belt 22f are fixed by engagement between the first engagement mechanism 22c and the second engagement mechanism 22e, the telescopic portion 22a has a high rigidity similar to a single columnar member.

The drive mechanism 22b includes a guide portion 22g with grooves formed on an outer circumferential surface thereof and a motor and a reduction gear that rotationally drive the guide portion 22g and has, for example, a configuration in which a rotational angular velocity of the motor is detected by a rotation sensor. In this embodiment, the drive mechanism 22b serves as a vibration generating portion of the conveyance robot 2.

The drive mechanism 22b rotates the guide portion 22g such that the first belt 22d and the second belt 22f accommodated therein are wound along the grooves of the guide portion 22g and the first belt 22d and the second belt 22f are wound around the same axis in a spiral shape in an overlapped state.

By this spiral winding, the telescopic portion 22a can be extended and contracted in the height direction. Accordingly, it is possible to extend the telescopic portion 22a in the height direction while maintaining a high rigidity thereof by winding the first belt 22d and the second belt 22f in this way.

On the other hand, the drive mechanism 22b reversely rotates the guide portion 22g such that the first belt 22d and the second belt 22f are unwound along the grooves of the guide portion 22g, that is, released from the wound state, and thus the telescopic portion 22a can be contracted in the height direction.

By unwinding the first belt 22d and the second belt 22f in this way, it is possible to contract the telescopic portion 22a in the height direction while compactly accommodating the first belt 22d and the second belt 22f.

The mounting portion 23 is provided at an upper end (a tip) of the telescopic portion 22a and ascends or descends according to extension or contraction of the telescopic portion 22a. The top surface of the mounting portion 23 includes a flat surface on which a conveyance object 4 is placed. The weight sensor 24 measures the weight of the conveyance object 4 placed on the mounting portion 23. The weight sensor 24 is provided, for example, in the mounting portion 23.

The control device 3 controls the operation of the conveyance robot 2. Specifically, the control device 3 includes a weight acquiring unit 31, an estimation unit 32, a storage unit 33, and a control unit 34 as illustrated in FIG. 1 and is mounted in the conveyance robot 2 in this embodiment.

The weight acquiring unit 31 acquires a total weight of the weight of the mounting portion 23 and the weight of the conveyance object 4 by acquiring a measurement result of the weight of the conveyance object 4 placed on the mounting portion 23 from the weight sensor 24 and adding the acquired weight to the weight of the mounting portion 23. The weight acquiring unit 31 may include the weight sensor 24.

The estimation unit 32 estimates the natural frequency of the conveyance robot 2 according to an amount of extension of the telescopic portion 22a, for example, based on the total weight of the weight of the mounting portion 23 and the weight of the conveyance object 4 and the rigidity of the telescopic portion 22a. Here, the natural frequency $\omega_0$ of the conveyance robot 2 can be calculated by Expression 1.

$$\omega_0 = \sqrt{\frac{3EI}{ml^3}} \quad \text{Expression 1}$$

Here, m denotes the total weight of the weight of the mounting portion 23 and the weight of the conveyance object 4, l denotes the length of the telescopic portion 22a, E denotes a Young's modulus, and I denotes a moment of inertia of area.

Here, since $3EI/l^3$ denotes the rigidity of the telescopic portion 22a, the natural frequency $\omega_0$ of the conveyance robot 2 can be calculated based on the total weight of the weight of the mounting portion 23 and the weight of the conveyance object 4 and the rigidity of the telescopic portion 22a as expressed in Expression 1.

The storage unit 33 stores, for example, the weight of the mounting portion 23, a preset safety factor, and a preset minimum angular frequency of the guide portion 22g of the drive mechanism 22b in the telescopic mechanism 22. The control unit 34 controls the drive mechanism 22b of the telescopic mechanism 22, for example, such that the natural frequency $\omega_0$ of the conveyance robot 2 and the angular frequency of the guide portion 22g of the drive mechanism 22b in the telescopic mechanism 22 do not match.

Figure 5:
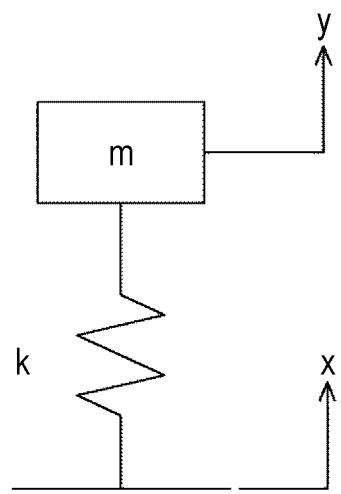
FIG. 5 is a diagram illustrating a general spring-mass system.

Here, vibration which is generated by the telescopic portion 22a of the conveyance robot 2 can be considered to be forced vibration of a spring-mass system as illustrated in FIG. 5. Here, a displacement x of the lower end of the telescopic portion 22a can be calculated by Expression 2.

$$x = A \cos \omega_a t \quad \text{Expression 2}$$

Here A denotes the amplitude of the lower end of the telescopic portion 22a, $\omega_a$ denotes the angular frequency of the guide portion 22g of the drive mechanism 22b in the telescopic mechanism 22, and t denotes time.

A motor equation for the total weight m of the weight of the mounting portion 23 and the weight of the conveyance object 4 can be calculated as expressed by Expression 3.

$$m\ddot{y} + k(y - x) = 0 \quad \text{Expression 3}$$

Here, y denotes a displacement of the conveyance object 4 placed on the mounting portion 23 and k denotes a spring constant.

Expression 3 can be rewritten as Expression 5 using Expression 4.

$$\omega_0 = \sqrt{\frac{k}{m}} \quad \text{Expression 4}$$

$$\ddot{y} + \omega_0^2(y - x) = 0 \quad \text{Expression 5}$$

Expression 6 can be derived by substituting Expression 2 into Expression 5.

$$\ddot{y} + \omega_0^2 y = A\omega_0^2 \cos \omega_a t \quad \text{Expression 6}$$

A particular solution of Expression 6 is Expression 7.

$$y = B \cos \omega_a t \quad \text{Expression 7}$$

Here, B denotes the amplitude of the conveyance object 4 placed on the mounting portion 23.

Here, B can be expressed by Expression 8.

$$B = \frac{\omega_0^2 A}{\omega_0^2 - \omega_a^2} \quad \text{Expression 8}$$

Based on the above description, an amplitude ratio can be expressed by Expression 9.

$$\frac{B}{A} = \frac{\omega_0^2}{\omega_0^2 - \omega_a^2} \quad \text{Expression 9}$$

The control unit 34 controls the drive mechanism 22b of the telescopic mechanism 22, for example, such that the guide portion 22g rotates at the angular frequency $\omega_a$ of the guide portion 22g of the drive mechanism 22b in the telescopic mechanism 22 at which the right side of Expression 9 is equal to or less than the preset safety factor. Here, a relationship between the amplitude B of the conveyance object 4 placed on the mounting portion 23 and the angular frequency $\omega_a$ of the guide portion 22g of the drive mechanism 22b in the telescopic mechanism 22 is illustrated in FIG. 6.

Figure 6:
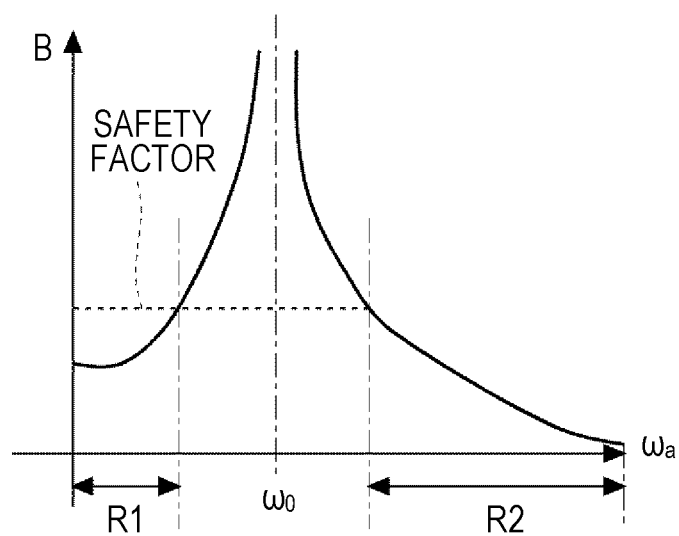
FIG. 6 is a diagram illustrating a relationship between the amplitude of a conveyance object placed on a mounting portion and an angular frequency of a guide portion of a drive mechanism in a telescopic mechanism.

That is, the control unit 34 controls the drive mechanism 22b of the telescopic mechanism 22, for example, such that the guide portion 22g of the drive mechanism 22b in the telescopic mechanism 22 rotates in a range R1 or a range R2 illustrated in FIG. 6. Accordingly, it is possible to control the drive mechanism 22b of the telescopic mechanism 22 such that the natural frequency $\omega_0$ of the conveyance robot 2 and the angular frequency $\omega_a$ of the guide portion 22g of the drive mechanism 22b in the telescopic mechanism 22 do not match, and to cause the conveyance robot 2 to operate stably according to the amount of extension of the telescopic portion 22a.

When the amount of extension (y−x) of the telescopic portion 22a is large, when the weight of the conveyance object 4 is large, or the like, the natural frequency $\omega_0$ of the conveyance robot 2 is lowered as expressed by Expression 1. When the guide portion 22g of the drive mechanism 22b in the telescopic mechanism 22 is rotated at the angular frequency in the range R1, the rotation of the guide portion 22g slows down very much.

Therefore, the control unit 34 can control the drive mechanism 22b of the telescopic mechanism 22, for example, such that the guide portion 22g of the drive mechanism 22b in the telescopic mechanism 22 rotates at the angular frequency in the range R2. Accordingly, it is possible to cause the telescopic mechanism 22 to operate rapidly and to improve operability of the conveyance robot 2.

Here, when a rotation speed of the guide portion 22g of the drive mechanism 22b in the telescopic mechanism 22 is increased, the angular frequency exceeds the natural frequency $\omega_0$ of the conveyance robot 2 between the range R1 and the range R2 but an increase of the amplitude B in the vicinity of the natural frequency $\omega_0$ of the conveyance robot 2 can be curbed by increasing a rotation acceleration of the guide portion 22g.

Figure 7:
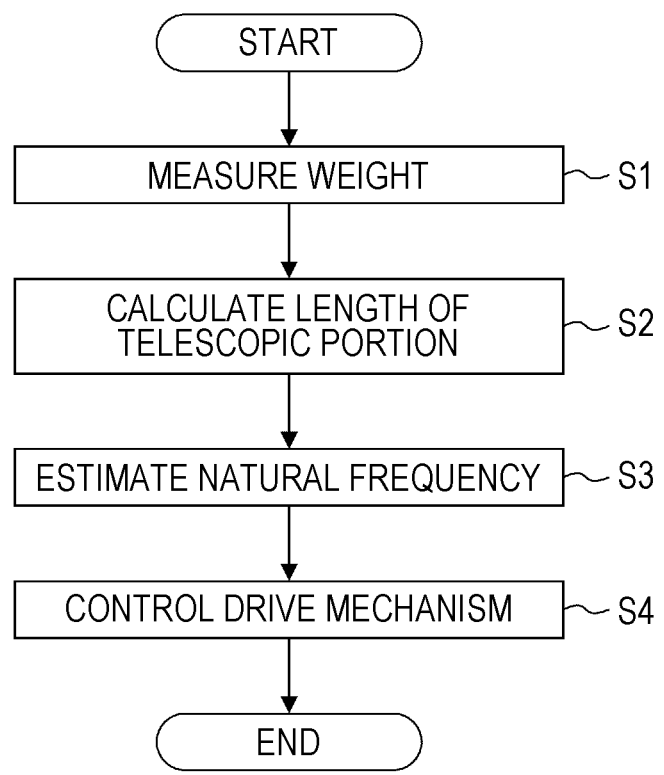
FIG. 7 is a flowchart illustrating a control flow of controlling the telescopic portion such that a conveyance object is conveyed to a desired height in the conveyance robot according to the embodiment.

A control flow of controlling the telescopic mechanism 22 to convey a conveyance object 4 to a desired height in the conveyance robot 2 according to this embodiment will be described below. FIG. 7 is a flowchart illustrating a control flow of controlling the telescopic mechanism 22 to convey a conveyance object to a desired height in the conveyance robot according to this embodiment.

First, when a conveyance object 4 is placed on the mounting portion 23 of the conveyance robot 2, the weight sensor 24 measures the weight of the conveyance object 4 (S1). Then, the weight acquiring unit 31 acquires a measurement result of the weight of the conveyance object 4 from the weight sensor 24, adds the acquired weight to the weight of the mounting portion 23, and acquires a total weight of the weight of the mounting portion 23 and the weight of the conveyance object 4.

Then, the telescopic portion 22a is extended to convey the conveyance object 4 to a desired height. Specifically, the control unit 34 calculates a length l of the telescopic portion 22a at that time based on a detection result from a rotation sensor provided in the drive mechanism 22b while controlling the drive mechanism 22b of the telescopic mechanism 22 such that the telescopic portion 22a is extended (S2).

Then, the estimation unit 32 estimates (calculates) the natural frequency Wo of the conveyance robot 2 according to the amount of extension of the telescopic portion 22a using Expression 1 based on the length l of the telescopic portion 22a and the total weight m of the weight of the mounting portion 23 and the weight of the conveyance object 4 (S3).

Then, the control unit 34 controls the drive mechanism 22b of the telescopic mechanism 22 based on the natural frequency $\omega_0$ of the conveyance robot 2 such that the guide portion 22g rotates in the range R1 or R2 of the angular frequency $\omega_a$ of the guide portion 22g of the drive mechanism 22b in the telescopic mechanism 22 in which the right side of Expression 9 is equal to less than the preset safety factor (S4).

A this time, the control unit 34 can control the drive mechanism 22b of the telescopic mechanism 22 based on the minimum angular frequency of the guide portion 22g of the drive mechanism 22b in the telescopic mechanism 22, an output limit of the drive mechanism 22b of the telescopic mechanism 22, and the like, for example, such that the guide portion 22g rotates at a maximum angular frequency in the range R1 or R2.

The control device 3 controls the drive mechanism 22b of the telescopic mechanism 22 while repeating the processes of S2 to S4, and stops the extending operation of the telescopic mechanism 22 when it is ascertained that the mounting portion 23 of the conveyance robot 2 has reached the desired height based on the detection result from the rotation sensor of the drive mechanism 22b.

With the control device 3, the conveyance system 1, and the control method according to this embodiment, it is possible to control the drive mechanism 22b of the telescopic mechanism 22 such that the natural frequency $\omega_0$ of the conveyance robot 2 and the angular frequency $\omega_a$ of the guide portion 22g of the drive mechanism 22b in the telescopic mechanism 22 do not match as described above, and it is possible to cause the conveyance robot 2 to operate stably according to the amount of extension of the telescopic portion 22a.

In the aforementioned description, the telescopic portion 22a is extended to convey a conveyance object 4 to a desired height, but the aforementioned control flow can also be similarly performed when the telescopic portion 22a is contracted to convey a conveyance object 4 to a desired height.

Figure 8:
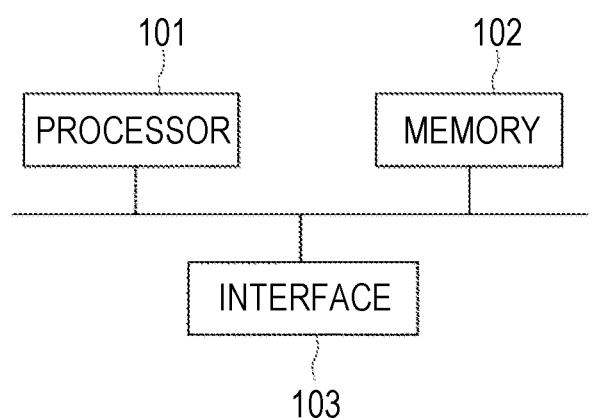
FIG. 8 is a diagram illustrating an example of a hardware configuration of a control device and a conveyance system.

The control device and the conveyance system according to the embodiment may have the following hardware configurations. FIG. 8 is a diagram illustrating an example of a hardware configuration of the control device and the conveyance system. The present disclosure can be embodied in the form of a control method as the control flow in the control device and the conveyance system described above in the aforementioned embodiment.

The hardware configuration illustrated in FIG. 8 includes an interface 103, a processor 101, and a memory 102. Some elements of the control device and the conveyance system described above in the embodiment are realized by causing the processor 101 to read a control program stored in the memory 102 and to execute the read control program. That is, the program is a program for causing the processor 101 to serve as some elements of the control device and the conveyance system. This program is a program for causing the control device and the conveyance system to perform processes in the configuration or a part thereof.

The aforementioned program can be stored in various types of non-transitory computer-readable media and be supplied to a computer (a computer including an information notification device). The non-transitory computer-readable media include various types of tangible storage media. Examples of the non-transitory computer-readable medium include a magnetic recording medium (such as a flexible disk, a magnetic tape, or a hard disk drive) and a magneto-optical recording medium (such as a magneto-optical disc). The examples also include a compact disc read only memory (CD-ROM) a CD-R, and a CD-R/W. The examples also include a semiconductor memory (such as a mask ROM, a PROM, an EPROM, a flash ROM, or a RAM). The program may be supplied to a computer using various types of transitory computer-readable media. Examples of the transitory computer-readable medium include an electrical signal, an optical signal, and electromagnetic waves. The transitory computer-readable medium can supply a program to a computer via a wired communication line such as an electric wire or optical fiber or a wireless communication line.

The present disclosure is not limited to the aforementioned embodiment and can be appropriately modified without departing from the gist thereof.

In the aforementioned embodiment, the drive mechanism 22b of the telescopic mechanism 22 is controlled such that the angular frequency of the guide portion 22g of the drive mechanism 22b in the telescopic mechanism 22 does not match the natural frequency of the conveyance robot 2, but the drive mechanism 21d of the mobile portion 21 may be controlled such that an angular frequency of the driving wheels 21b which are vibration generating portions does not match the natural frequency of the conveyance robot 2.

In this case, for example, the natural frequency of the conveyance robot 2 can be estimated based on a detection result from an acceleration sensor provided in the mobile portion 21, and the drive mechanism 21d of the mobile portion 21 can be controlled such that the angular frequency of the driving wheels 21b does not match the estimated natural frequency of the conveyance robot 2.

In brief, a drive mechanism which is provided in the conveyance robot 2 has only to be controlled such that the angular frequency of the vibration generating portion does not match the natural frequency of the conveyance robot 2.

In the aforementioned embodiment, the telescopic mechanism 22 is configured as a telescope type telescopic mechanism, but the configuration of the telescopic mechanism 22 is not particularly limited as long it can extend and contract in the height direction of the conveyance robot 2.

In the aforementioned embodiment, the control device 3 is mounted in the conveyance robot 2, but some elements of the control device 3 may be mounted in a server or the like outside of the conveyance robot 2.

In the aforementioned embodiment, the conveyance robot 2 is configured as an autonomous mobile robot, but may be a robot that moves in accordance with a user's instruction.

What is claimed is:

1. A control device for a conveyance robot including a telescopic device which is extensible in a height direction and a drive device for horizontal movement of the conveyance robot, the telescopic device being mounted on the drive device for the horizontal movement, the control device comprising a processor configured to:
estimate a natural frequency of the conveyance robot based on an amount of extension of the telescopic device; and
control a drive device of the telescopic device such that the estimated natural frequency of the conveyance robot and an angular frequency of the drive device of the telescopic device do not match, the angular frequency being generated when the drive device of the telescopic device operates.

2. The control device according to claim 1, wherein the processor is further configured to:
acquire a measurement result of a weight of a conveyance object which is placed on a mounting table provided at an upper end of the telescopic device; and
estimate the natural frequency of the conveyance robot based on a total weight of a weight of the mounting table and the weight of the conveyance object and a rigidity of the telescopic device.

3. A conveyance system comprising:
the control device according to claim 1; and
the conveyance robot.

4. The conveyance system according to claim 3, further comprising a weight sensor that measures a weight of a conveyance object which is placed on a mounting table provided at an upper end of the telescopic device.

5. The control device according to claim 2, wherein:
the telescopic device is configured to be extended and contracted in the height direction by rotating by using the drive device of the telescopic device; and
the processor is configured to control the drive device of the telescopic device such that the angular frequency is larger than the estimated natural frequency, when an amount of extension of the telescopic device is larger than a predetermined amount or when the weight of the conveyance object is larger than a predetermined weight.

6. A control method for a conveyance robot including a telescopic device which is extensible in a height direction and a drive device for horizontal movement of the conveyance robot, the telescopic device being mounted on the drive device for the horizontal movement, the control method comprising:
estimating a natural frequency of the conveyance robot based on an amount of extension of the telescopic device; and
controlling a drive device of the telescopic device such that the estimated natural frequency of the conveyance robot and an angular frequency of the drive device of the telescopic device do not match, the angular frequency being generated when the drive device of the telescopic device operates.

7. The control method according to claim 6, further comprising:
measuring a weight of a conveyance object which is placed on a mounting table provided at an upper end of the telescopic device; and
estimating the natural frequency of the conveyance robot based on a total weight of a weight of the mounting table and the weight of the conveyance object and a rigidity of the telescopic device.

8. A non-transitory storage medium storing instructions that are executable by one or more processors for controlling a conveyance robot and that cause the one or more processors to perform functions, the conveyance robot including a telescopic device which is extensible in a height direction and a drive device for horizontal movement of the conveyance robot, the telescopic device being mounted on the drive device for the horizontal movement, the functions comprising:
estimating a natural frequency of the conveyance robot based on an amount of extension of the telescopic device; and
controlling a drive device of the telescopic device such that the estimated natural frequency of the conveyance robot and an angular frequency of the drive device of the telescopic device do not match, the angular frequency being generated when the drive device of the telescopic device operates.

9. The non-transitory storage medium according to claim 8, wherein the functions further include:
measuring a weight of a conveyance object which is placed on a mounting portion table provided at an upper end of the telescopic device; and
estimating the natural frequency of the conveyance robot based on a total weight of a weight of the mounting table and the weight of the conveyance object and a rigidity of the telescopic device.

10. The control device according to claim 9, wherein the controller is configured to control the drive device of the telescopic device such that the angular frequency is less than a predetermined safety factor.

* * * * *